United States Patent Office 3,705,861
Patented Dec. 12, 1972

3,705,861
CATALYST FOR THE HYDROGENATION OF DISTILLATION RESIDUUM-CONTAINING PETROLEUM HYDROCARBONS
Yutaka Oguchi, Tokyo, and Hirotsugu Nomura, Kawasaki, Japan, assignors to Nippon Oil Company, Ltd., Tokyo, Japan
No Drawing. Filed June 1, 1970, Ser. No. 42,463
Claims priority, application Japan, June 3, 1969, 44/42,906
Int. Cl. B01j 11/40, 11/44
U.S. Cl. 252—448
9 Claims

ABSTRACT OF THE DISCLOSURE

Distillation residuum-containing petroleum hydrocarbons are hydrogenated stably by using a catalyst composed of a hydrogenatingly active metal compound, such as nitrates and ammonium salts of cobalt-molybdenum, nickel-molybdenum, nickel-cobalt-molybdenum and nickel-tungsten, supported on a carrier derived from a gelled dispersion mixture comprising a hydrosol of basic aluminum sulfate or a mixed hydrosol of basic aluminum sulfate and silica and particles of a water-insoluble inorganic solid, such as aluminum hydroxide, silica gel, or kaolinite, or its hydrogel. The excellent activity of the catalyst is maintained for a prolonged period of time.

This invention relates to an improved process for the catalytic hydrogenation of the distillation residuum-containing petroleum hydrocarbons and to an improved catalyst for use therein, whereby the difficulties encountered heretofore in carrying out the process stably and with good activity over a prolonged period of time have been overcome.

More specifically, the invention relates to a process for the treatment of petroleum hydrocarbons which comprises the hydrogenation of the distillation residuum-containing petroleum hydrocarbons in the presence of a catalyst which has been obtained in the following manner. A dispersion mixture consisting of a sol selected from the group consisting of a hydrosol of basic aluminum sulfate and a hydrosol mixture of said hydrosol with a hydrosol of silica and containing dispersed therein 5–65% by weight, based on the carrier material to be obtained, of particles selected from the group consisting of water-insoluble inorganic solids and hydrogels thereof is passed through an water-immiscible inert liquid medium to form a spherical gelled product, which is water-washed and desulfated, followed by drying and calcination to yield the carrier material which by being impregnated with an aqueous solution of a hydrogenatively active metal compound and thereafter calcinated at a temperature above 350° C. provides the catalyst for use in the aforesaid catalytic hydrogenation of petroleum hydrocarbons.

As regards the catalytic hydrogenation of petroleum, numerous purification processes have been developed and are being operated in connection with those cases where distillate oil is used as the feed stock. However, in the case of the treatment of the fraction containing the distillation residual, continuous operation over a prolonged period of time was difficult owing to the shortness of the life of the catalyst attributable to a marked decline in the activity of catalyst due to the asphaltenes and metals contained in the feed stock. Thus, the development of a process which would make it possible to carry out the catalytic hydrogenation treatment stably and with excellent activity over a prolonged period of time was desired.

The distillation residual, and especially the asphaltenes contained therein, tended to cause the separation of a carbonaceous material during the hydrogenation reaction and, in the conventional processes, the separated carbonaceous material by blanketing the surface of the catalyst became the cause of a decline in its catalytic activity. Further, it is known that the metals (chiefly vanadium and nickel) which are present in distillation residual, and especially in the asphaltenes contained therein, also became deposited on the surface of the catalyst to become a cause for further aggravating the decline of the activity of the catalyst.

As a result of our researches with a view to overcoming this drawback of the conventional processes in conducting the catalytic hydrogenation of the distillation residuum-containing petroleum hydrocarbons, we discovered that such a treatment could be carried out continuously while maintaining the good activity of the catalyst stably over a long period of time by the use of a catalyst which utilizes the hereinbefore described special carrier material and supports thereon a known hydrogenatively active metal.

Further, it was found, as illustrated by means of the hereinafter given control experiments, that the superior improvements of the invention could not be achieved when the carrier material utilized is one prepared by using a dispersion mixture from which either the aforesaid particles selected from the group consisting of the water-insoluble inorganic solids and hydrogels thereof have been omitted or have been incorporated in an amount less than 5%, say, only 4% and also, as illustrated similarly by means of the hereinafter given control experiments, that the ends of the present invention likewise cannot be achieved when the calcination temperature used in accomplishing the support of the known hydrogenatively active metal on the carrier is less than 350° C., for example, when the temperature falls to 300° C.

Accordingly, an object of the present invention is to provide an improved process and an improved catalyst composition therefor by which the heretofore difficult catalytic hydrogenation treatment of the distillation residuum-containing petroleum hydrocarbons can be continuously carried out while maintaining the good activity of the catalyst stably over a prolonged period of time.

Other objects and advantages of the invention will become apparent from the following description.

The catalyst used in the present invention is obtained in the following manner. Particles selected from the group consisting of water-insoluble inorganic solids and hydrogels thereof are uniformly dispersed in either a hydrosol of basic aluminum sulfate (hereinafter referred to at times as alumina type hydrosol) or a hydrosol mixture of this hydrosol with a hydrosol of silica (hereinafter referred to at times as a silica-alumina type hydrosol), in an amount within a specific range. The so obtained dispersion mixture is then passed through a water-immiscible inert liquid medium to form a spherical gel, which is washed with water. The so obtained gel is then removed of its sulfate radicals by contacting the gel with an aqueous alkaline solution, followed by drying and calcining the gel, and preferably calcining it at, say, above 750° C. after drying it to obtain a spherical alumina or silica-alumina carrier material, which is immersed in an aqueous solution of a hydrogenatively active metal compound and thereafter usually dried and calcined at above 350° C. to obtain the intended catalyst.

The alumina type hydrosol is obtained commercially as a supernatant liquid by adding powdered calcium carbonate slowly to concentrated aqueous aluminum sulfate with vigorous stirring to precipitate the sulfate radicals as calcium sulfate. The molar ratio of $SO_3/Al_2O_3$ in this hydrosol is suitably in the range of 0.8–1.6.

Such ions as $Na^+$, $K^+$, $Mg^{++}$, $Ca^{++}$, $Zn^{++}$, $Fe^{++}$ and $NH_4^+$ may be present as impurities in the aqueous aluminum sulfate used in the present invention as the starting material.

The silica-aluminum type hydrosol is obtained by merely mixing an alumina type hydrosol with a hydrosol of silica.

According to the invention, a water-insoluble inorganic solid or a hydrosol thereof is dispersed finely in the foregoing alumina type or silica-alumina type hydrosol.

As this water-insoluble inorganic solid, any inorganic solid can be used without any particular restrictions so long as it is one which does not substantially dissolve in water as well as does not decompose in the aforesaid hydrosol nor otherwise sets up a chemical change. The hydrogels of these inorganic solids can also be fully used for the purpose of invention. A number of examples of such a substance will be given below.

Alumina type substances:
Aluminum hydroxide, activated alumina, alumina oxide and alumina hydrogen.

Silica type substances:
Silica gel, silica hydrogel and powdered quartz.

Silica-alumina type substances:
Silica-alumina type gel, silica-alumina type hydrogel, acid clay, activated clay, kaolinite, montmorillonite, bentonite and other like clayey minerals and aluminosilicates, e.g. natural or synthetic zeolite.

Other metal oxides, hydroxides or sulfides:
For example, the oxides, hydroxides or sulfides of such metals as iron, cobalt, nickel, molybdenum and copper. Active carbon.

In the present invention, it is preferred from the standpoint of the resulting product that of the foregoing inorganic solids one which is porous, for example, one whose specific surface area is greater than 50 square meters per gram, be used. It is also, of course, possible to use the foregoing metal oxides, hydroxides or sulfides having catalytic activity, though their specific surface area itself may be small. These solid materials need not necessarily be used singly but may also be used in combination of two or more classes.

According to the invention, these inorganic solids or hydrogels thereof are added to the alumina type or silica-alumina type hydrosol in such a proportion that the content therein becomes 5% to 65% by weight, and preferably 10-50% by weight, based on the resulting carrier material. When the inorganic solids are added in an amount such that the proportion is less than 5% by weight, the desired effects are not noted and the ends of the invention cannot be attained. On the other hand, when this addition is in such a proportion that 65% by weight is exceeded, either the formation of the spherical gelled product becomes difficult or the particles of the spherical gelled product, even though capable of being formed, suffers such a reduction in strength as to be not serviceable.

In the present invention, it is particularly preferred that the particles selected from the aforesaid inorganic solids or the hydrogels thereof be commingled in the alumina type or silica-alumina type hydrosol in as finely divided state as possible for imparting the desired activity without a substantial decline in the particle strength of the spherical gelled product formed. For this purpose, it is preferred that the inorganic solids have a particle diameter of less than 74 microns (200-mesh size), and especially less than 30 microns. On the other hand, when the hydrogel of an inorganic solid is to be used, it is preferred that the hydrogel be finely dispersed in the alumina type or silica-alumina type hydrosol by mixing in a conventional rotating ball mill on the order of about 10 minutes.

Thus, in accordance with the invention, a homogeneous mixture wherein either an inorganic solid material or a hydrogel thereof is dispersed uniformly in a finely divided state in either an alumina type or silica-alumina type hydrosol is obtained. This dispersion mixture is then passed through a water-immiscible inert liquid medium to form the spherical gelled product of the invention.

As this liquid medium, an organic medium which is water-immiscible and inert to the aforesaid dispersion mixture is used, preferably useable being the petroleum hydrocarbons. The temperature of the liquid medium is suitably varied depending upon the time required for passing the dispersion mixture therethrough and effecting the gelation and the size desired for the spherical gelled product, but usually a liquid warmed or heated at 40-100° C. is used.

While it is necessary to specify the heating time strictly for obtaining a perfect spherical gelled product, this time, as noted hereinabove, is suitably varied depending upon the temperature of the liquid medium and the size desired for the spherical gelled product. The spherical gelled product used in the present invention need not be a perfect sphere but will suffice if nearly so. Hence, it is to be understood that the spherical gelled product, as referred to herein, is not a term denoting a perfect sphere.

On the other hand, the size of the hydrogel, and hence the size of the carrier material, can be regulated over a broad range as a result of its relationship with the size of the nozzle from which the dispersion mixture is discharged into the heated liquid medium, the difference in specific gravities of the dispersion mixture and the medium, and the viscosity and surface tension of the dispersion mixture. Further, for promoting the uniform hydrogelation, the addition of preferably 10-30% by weight of water is made to the dispersion mixture prior to its being passed through and heated in the liquid medium, the addition being preferably made as immediately prior to this operation as possible. In addition, for preventing cracks to form during the hydrogelation, the gas contained dissolved in the dispersion mixture is preferably eliminated prior to the operation.

The spherical hydrogel formed is subjected to hydrolysis by pouring fresh water or hot water thereon to remove a part of the sulfate radicals, thus rendering it stable and preventing its reversion to a sol. Next, it is brought into contact with an aqueous alkaline solution to gradually raise its pH, thereby eliminating the remaining sulfate radicals as sulfates.

While the aqueous caustic alkali solutions and aqueous alkali carbonate solutions can be used as the foregoing aqueous alkaline solution, the aqueous alkaline solutions such as ammonia water and aqueous urea solution can be recommended. An abrupt raising of the pH is not desirable, since cracks will form in the hydrogel which, upon drying, will result in breakage of the hydrogel or reduction in its pressure resisting strength or resistance to attrition and hence make it easily breakable.

After completion of the alkaline treatment, the sulfate radicals are removed as completely as possible by washing with water, after which the spherical hydrogel product is dried and calcined. The drying operation is preferably carried out slowly in the presence of saturated steam, since cracks will form in the hydrogel if the drying is carried out too hastily. Usually, the spherical hydrogel is dried and then also calcined. Since a tendency to a decline in the desulfurization activity takes place if the calcination temperature is too high, it is preferred in this invention to carry out the calcination at a temperature ranging, say, from 350 to 750° C. A calcination time of 1-3 hours is preferred.

The spherical carrier material obtained as hereinabove described has great pressure resisting strength and heat resistance and does not easily crack. This is used for preparing the catalyst to be used in the invention process.

The so obtained carrier material is then immersed in an aqueous solution of a hydrogenatively active metal compound, followed by drying and calcination to obtain the intended catalyst.

As the hydrogenatively active metals, suitably used are the various metals which are useable as hydrogenation treatment catalysts, such, for example, as one or more metals selected from the metals of Groups VI and VIII of the periodic table, particularly cobalt-molybdenum, nickel-molybdenum, nickel-cobalt-molybdenum and nickel-tungsten. The water-soluble compounds of such metals include such, for example, as the nitrates and ammonium salts of these metals.

If the calcination temperature used in preparing the catalyst is too low, an effective activity is not demonstrated. Hence, the calcination must be conducted at a temperature above 350° C. Usually, a temperature range on the order of 350–600° C. is employed.

When the foregoing catalyst is used in the hydrogenation of the hydrocarbons containing the petroleum distillation residual, as well as asphaltenes and metals, its duration of activity is very great as compared with the conventional catalysts.

The invention process can be carried out either continuously or batchwise. Further, in carrying out the process continuously, the various known methods such as the fixed, moving or fluidized bed technique can be employed.

While the catalyst may be used in its as-obtained state, its presulfiding may also be carried out. The presulfiding of the catalyst can be carried out in customary manner.

The invention process is particularly preferred for carrying out the hydrodesulfurization of the distillation residuum-containing petroleum hydrocarbons.

For checking the hydrogenolysis as much as possible and carrying out the hydrodesulfurization more selectively, the silica content of the carrier material should preferably be reduced. Thus, in order that the carrier material will be more suitable for use in the hydrodesulfurization of the distillation residuum-containing petroleum hydrocarbons, as intended by the invention, the addition of the silica component in preparing the carrier material is made such that its content therein becomes not greater than a $SiO_2/(Al_2O+SiO_2)$ weight ratio of 0.3.

The reaction conditions in carrying out the hydrodesulfurization of the distillation residuum-containing petroleum hydrocarbons usually range as follows: temperature 300–500° C., pressure 50–300 kg./cm.$^2$ g., liquid hourly space velocity of the feedstock oil 0.2–5 vol./vol./hr., and flow rate ratio of hydrogen to feedstock oil 300–3000 liter-NTP/liter; an optimum combination of the various conditions being chosen in accordance with the properties of the feedstock oil and the properties required in the resulting product.

The desulfured oil leaving the reaction column, after separation of the gas, is submitted to steam stripping, reduced pressure steam stripping, vacuum or atmospheric distillation, or a combination of these treatments to obtain the final product.

The following examples are given for a further illustration of the setup and effects of the invention more specifically, it being understood that the invention is not intended to be limited by these examples.

EXAMPLES 1–4 AND CONTROLS 1–3

210 grams of powdered calcium carbonate was slowly added with vigorous stirring over a period of about 10 hours to one liter of aqueous aluminum sulfate solution normally saturated at room temperature [11.80/100 cc. $Al_2O_3$, 28.2 g./100 cc. $SO_3$, $SO_3/Al_2O_3$ (molar ratio)=3, pH 1.4], and a hydrosol of basic aluminum sulfate having the following composition was obtained as a supernatant.

$Al_2O_3$ _____ 10.54 g./100 cc.
$SO_3$ _____ 10.22 g./100 cc.
$SO_3/Al_2O_3$ (molar ratio) ___ 1.12
pH _____ 3.68/15° C.
Specific gravity _____ 1.246/15° C.

Separately, while cooling 1000 cc. of 20% sulfuric acid with ice, 4280 cc. of aqueous sodium silicate solution [9.17 g./100 cc. $SiO_2$, $SiO_2/Na_2O$ (molar ratio)=2.98] were reacted therewith by adding dropwise thereto with stirring to thereby prepare a hydrosol of silica (10.44 g./100 cc. $SiO_2$, pH 1.61). To a mixture of 100 cc. of the hydrosol of basic aluminum sulfate and 10 cc. of the hydrosol of silica was added as the water-insoluble inorganic solid material finely divided aluminum hydroxide (boehmite) comminuted to less than 10 microns in the amounts of respectively 0.5, 4, 8, 15 and 22 grams. Each of the mixed specimens was placed in a 7-liter ball mill and the three components were uniformly dispersed by agitation for 20 minutes. The dispersion mixture was then allowed to drop from the top of a granulation column filled with a solvent mixture of spindle oil and trichlorobenzene (sp. gr. 1.210/15° C.). The solvent was maintained at 85° C. with a heater. The sol was heated in the solvent and became a spherical hydrogel of 2–4 mm. diameter by the time it reached the bottom of the column. The hydrogel at the bottom of the column was withdrawn via a pipe and introduced to a separately provided tank filled with water. The operation of adding hot water to the tank containing the hydrogel and discarding the hot water was repeated from 5 to 8 times, using fresh water each time. By this operation, a part of the about 1.12 mols of sulfate radicals bonded to the hydrogel was washed out by hydrolytic action to reduce the sulfate radicals bonded to about 0.63 on the basis of molar ratio $SO_3/Al_2O_3$ of the hydrogel. After draining off the water, water in an amount sufficient to cover the hydrogel was again added and 28% ammonia water was slowly added dropwise until a pH of 9.5–9.7 was attained, followed by heating for 6 hours at 50° C. As a result of this operation, the sulfate radicals remaining in the hydrogel were converted to ammonium sulfate and separated from the hydrogel. Next, water was added and washing was continued until the sulfate radicals could no longer be detected. Thereafter, the hydrogel was dried in a practically closed 120° C. constant temperature tank over a period of 24 hours, after which it was further calcined for 3 hours at 550° C. to obtain spherical silica-alumina of 1–2 mm. diameter.

The properties of the so obtained spherical silica-alumina are shown in Table 1.

TABLE 1

| Experiment | Composition of starting material | | | Amount added of aluminum hydroxide based on carrier (wt. percent) | Carrier composition[1] (wt. percent) | | Pressure resisting strength[2] (kg.) |
|---|---|---|---|---|---|---|---|
| | Basic aluminum sulfate sol (cc.) | Silicic acid sol (cc.) | Aluminum hydroxide powder(g.) | | $Al_2O_3$ | $SiO_2$ | |
| Example: | | | | | | | |
| 1 | 100 | 10 | 4 | 25 | 90.9 | 3.0 | 106 |
| 2 | 100 | 10 | 8 | 40 | 92.0 | 2.0 | 89 |
| 3 | 100 | 10 | 15 | 55 | 93.4 | 1.6 | 62 |
| 4 | 100 | 10 | 22 | 55 | 94.2 | 0.8 | 21 |
| Control: | | | | | | | |
| 1 | 100 | 10 | 0 | 0 | 89.3 | 4.6 | 122 |
| 2 | 100 | 10 | 0.5 | 4 | 89.5 | 4.4 | 121 |

[1] Contains as a chemical composition 5–7 weight percent of ignition loss and a small quantity of CaO and MgO besides the $Al_2O_3$ and $SiO_2$.
[2] A single spherical carrier is clasped between a pair of steel plates disposed in parallel and pressure is slowly applied. The load at the time of breakage of the spherical carrier is measured and the numerical values of 20 tests are arithmetically averaged.

Further, by way of comparison, an attempt was made to gel into spherical form by the same procedure as hereinabove described a dispersion mixture consisting of 100 cc. of a hydrosol of basic aluminum sulfate and 10 cc. of a hydrosol of silica to which had been added 30 grams (equal to 70% by weight of the carrier) of powdered aluminum hydroxide (boehmite) all of the components being identical to those used hereinabove. However, the formation of the spherical gel was difficult and spherical silica-alumina that could withstand use could not be obtained.

Of the resulting spherical silica-alumina having the properties shown in Table 1, those having a diameter of 1.5 mm. in the several experiments were chosen and used as the carrier material. The catalysts were then prepared in the following manner.

To 265.3 grams of ammonium paramolybdate were added 280 cc. of water followed by the addition with stirring of 530 cc. of ammonia water to effect the complete dissolution of the ammonium paramolybdate. Separately, an aqueous solution of 212.3 grams of cobalt nitrate in 210 cc. of water was prepared, after which this solution was slowly added dropwise to the previously prepared ammonium molybdate solution with stirring to prepare a combined solution.

In 600 cc. of the so obtained combined solution were immersed 300 cc. of each of the previously described spherical carriers for 3 hours, after which the carriers were dried for 5 hours at 110° C., and finally calcined for 3 hours at 500° C. The so obtained catalysts contained the active metals of molybdenum and cobalt in the amounts of 9.8–10.1% by weight and 2.9–3.1% by weight, respectively.

By way of comparison, a carrier prepared as in Example 1 was impregnated with equal amounts of these metals by the same procedure, followed by drying and calcining for 3 hours at 300° C. to prepare a catalyst, which was used in Control 3.

The foregoing catalysts were used and the hydrodesulfurization of the atmospheric distillation residual of Khafuji crude was carried out in a fixed bed reaction column. The catalysts were presulfided after their packing but before their use, using a gas mixture of hydrogen and hydrogen sulfide. The reaction conditions were: a temperature of 400° C., a pressure of 150 kg./cm.$^2$ g., a liquid hourly space velocity of 1 vol./vol./hr., and a ratio of the flow of hydrogen to feedstock oil of 1000 liter-NTP/liter. The desulfured oil leaving the reaction column was subjected to reduced pressure steam stripping to distill off the hydrogen sulfide as well as other gases and cracked light oils thereby yielding the final product. The changes that occurred in the total sulfur content of the products from the start of the test to 1000 hours are shown in Table 2. On the other hand, the properties of the products at a point 500 hours after the start of the test are shown in Table 3.

TABLE 2

| Experiment | Total sulfur content (wt. percent) | | | | |
|---|---|---|---|---|---|
| | Feedstock oil | After— | | | |
| | | 50 hours | 100 hours | 500 hours | 1,000 hours |
| Example: | | | | | |
| 1 | 4.46 | 0.59 | 0.61 | 0.75 | 0.92 |
| 2 | 4.46 | 0.67 | 0.69 | 0.75 | 0.84 |
| 3 | 4.46 | 0.71 | 0.72 | 0.79 | 0.88 |
| 4 | 4.46 | 0.76 | 0.77 | 0.85 | 0.96 |
| Control: | | | | | |
| 1 | 4.46 | 0.65 | 0.71 | 1.06 | 1.52 |
| 2 | 4.46 | 0.64 | 0.70 | 1.02 | 1.49 |
| 3 | 4.46 | 1.08 | 1.20 | 1.57 | |

TABLE 3

| | Total sulfur content (wt. percent) | Viscosity (cst. at 50° C.) | Residual carbon (wt. percent) | Asphaltene[1] content (wt. percent) | Vanadium content (p.p.m.) | Nickel content (p.p.m.) | Total nitrogen content (wt. percent) | Amount formed of cracked light oils (wt. percent based on feedstock oil) |
|---|---|---|---|---|---|---|---|---|
| Feedstock oil | 4.46 | 939.0 | 13.20 | 9.00 | 88 | 28 | 0.27 | |
| Example: | | | | | | | | |
| 1 | 0.75 | 431.2 | 10.13 | 7.16 | 63 | 20 | 0.16 | 3.6 |
| 2 | 0.75 | 430.7 | 10.13 | 7.21 | 63 | 21 | 0.15 | 3.4 |
| 3 | 0.79 | 435.3 | 10.19 | 7.18 | 65 | 21 | 0.15 | 4.0 |
| 4 | 0.85 | 434.7 | 10.22 | 7.35 | 66 | 21 | 0.14 | 3.3 |
| Control: | | | | | | | | |
| 1 | 1.06 | 445.2 | 10.43 | 7.65 | 65 | 21 | 0.17 | 3.6 |
| 2 | 1.02 | 448.3 | 10.35 | 7.53 | 65 | 20 | 0.17 | 3.8 |
| 3 | 1.57 | 470.6 | 10.93 | 8.31 | 72 | 23 | 0.19 | 3.5 |

[1] Petroleum ether-insoluble portion.

As can be seen by comparing with Controls 1 and 2, the rate of maintenance of the desulfurization activity of the catalysts prepared in accordance with the present invention is exceedingly high.

Further, as shown by Control 3, it can be seen that the desulfurization activity and the rate of maintenance thereof are low in the case of a catalyst prepared by impregnation with active metals, drying and thereafter calcining at 300° C.

EXAMPLES 5–8 AND CONTROLS 4–5

To 100 cc. of a hydrosol of basic aluminum sulfate [10.54 g./100 cc. $Al_2O_3$, 10.22 g./100 cc. $SO_3$, $SO_3Al_2O_3$ (molar ratio)=1.12, pH 3.68] was added as the water-insoluble inorganic solid material a hydrogel of aluminum hydroxide (6.2 g./100 g. obtained by adding ammonia water to aluminum sulfate solution, neutralizing and water-washing) in the amounts respectively of 5.3, 19.0, 73.0, 170 and 255 grams, after which the several mixtures were placed in a 7-liter ball mill and agitated for 20 minutes to obtain the dispersion mixtures.

The so obtained dispersion mixture was introduced to a granulation column containing a solvent mixture of trichlorobenzene and spindle oil (sp. gr. 1.210 at 15° C.), the dispersion mixture being added dropwise from the top of the column while maintaining the temperature of the solvent at 85–90° C. The starting dispersion mixture while being heated descended through the granulation column to become a spherical hydrogel of 2–4 mm. diameter. The hydrogel was immediately withdrawn from the bottom of the column by means of a pump and transferred to a tank having a perforated dish at its bottom, where the hydrogel was water-washed for 24 hours until no further presence of sulfate radicals could be detected, then dried at 150° C. and further calcined for 3 hours at 550° C. to obtain spherical alumina of 1–2 mm. diameter. The properties of the so obtained spherical alumina are shown in Table 4.

TABLE 4

| Experiment | Composition of starting material | | Proportion of aluminum-hydroxide hydrogel (wt percent based on carrier) | Pressure resisting strength (kg.) |
|---|---|---|---|---|
| | Basic aluminum sulphate sol (cc.) | Aluminum hydroxide hydrogel (g.) | | |
| Example: | | | | |
| 5 | 100 | 19.0 | 10 | 105 |
| 6 | 100 | 73.0 | 30 | 96 |
| 7 | 100 | 170 | 50 | 81 |
| 8 | 100 | 255 | 60 | 25 |
| Control: | | | | |
| 4 | 100 | 0 | 0 | 136 |
| 5 | 100 | 5.3 | 3 | 129 |

Of the spherical alumina obtained, those of 1.5 mm. diameter were chosen in each case and used as the carrier.

Next, 123.6 grams of ammonium paramolybdate were completely dissolved by adding 250 cc. of water and further 425 cc. of 28% ammonia with stirring. Separately, an aqueous solution of 102.5 grams of cobalt nitrate in 150 cc. of water was prepared. The ammonium molybdate solution was then added to the cobalt nitrate solution to make a combined solution. 300 cc. of each of the several spherical carriers prepared in accordance with the hereinbefore described procedure were added respectively to 600 cc. of the foregoing combined solution and immersed therein for 3 hours, after which they were dried and finally calcined for 3 hours at 500° C. The active metal contents of the so obtained catalysts were 6.6–6.9% by weight of molybdenum and 2.4–2.6% by weight of cobalt.

The hydrodesulfurization was carried out under identical conditions as in Examples 1–4 using the same feedstock oil as used therein with a fixed bed packed with the foregoing catalysts. The changes that occurred in the total sulfur content of the products from the start of the test to 1000 hours are shown in Table 5.

TABLE 5

| Experiment | Total sulfur content (wt. percent) | | | | |
|---|---|---|---|---|---|
| | Feedstock oil | After— | | | |
| | | 50 hours | 100 hours | 500 hours | 1,000 hours |
| Example: | | | | | |
| 5 | 4.46 | 0.58 | 0.68 | 0.91 | 1.07 |
| 6 | 4.46 | 0.65 | 0.71 | 0.81 | 0.90 |
| 7 | 4.46 | 0.68 | 0.70 | 0.76 | 0.87 |
| 8 | 4.46 | 0.72 | 0.75 | 0.84 | 0.92 |
| Control: | | | | | |
| 4 | 4.46 | 0.68 | 0.73 | 1.09 | 1.53 |
| 5 | 4.46 | 0.64 | 0.71 | 1.05 | 1.50 |

As is apparent when compared with Controls 4 and 5 in which either a hydrogel of a water-insoluble inorganic solid material was not added or the addition thereof was less than 5% by weight, the desulfurization activity of the catalyst prepared in accordance with the present invention is exceedingly high.

EXAMPLES 9–14 AND CONTROL 6

To 100 cc. of the same hydrosol of basic aluminum sulfate [10.54 g./100 cc. $Al_2O_3$, 10.22 g./100 cc. $SO_3$, $SO_3/Al_2O_3$ (molar ratio)=1.12, pH 3.68/15° C.] as in Examples 1–4 were added respectively synthetic zeolite (27.8 wt. percent $Al_2O_3$, 41.3 wt. percent $SiO_2$, 8.8 wt. percent $Na_2O$, 22.1 wt. percent $H_2O$), activated clay (77.9 wt. percent $Al_2O_3$, 11.4 wt. percent $SiO_2$, specific surface area 208 m.²/g.), kaolinite (47.36 wt. percent $SiO_2$, 38.54 wt. percent $Al_2O_3$, specific surface area 10 m.²/g.), active carbon (specific surface area 735 m.²/g.), quartz powder and iron hydroxide, in amounts such that their contents would be 25% by weight based on the carrier and stirred so as to become uniformly mixed to obtain the several dispersion mixtures. This was followed by granulation of the mixture, then water-washing, ammonia treatment, drying and calcining as in Example 1–4. The properties of the so obtained spherical carriers are shown in Table 6.

TABLE 6

| Experiment | Class of powder mixed | Proportion of the powder based on carrier (wt. percent) | Pressure resisting strength (kg.) |
|---|---|---|---|
| Example: | | | |
| 9 | Synthetic zeolite | 25 | 85 |
| 10 | Activated clay | 25 | 76 |
| 11 | Kaolinite | 25 | 74 |
| 12 | Active carbon | 25 | 70 |
| 13 | Quartz powder | 25 | 65 |
| 14 | Iron hydroxide | 25 | 70 |
| Control 6 | None | | 90 |

Of the spherical carriers obtained, those of 1.5 mm. diameter were chosen in each case, and using the so chosen carriers, catalysts were prepared in the following manner.

264.5 grams of ammonium paramolybdate were completely dissolved by adding 179.1 cc. of water thereto and by the further addition of 716.1 cc. of 28% ammonia water with stirring. Separately, an aqueous solution was prepared by dissolving 235.8 grams of cobalt nitrate and 118 grams of nickel nitrate in 208.5 cc. of water. The ammonium molybdate solution was then slowly added dropwise with stirring to the solution containing cobalt nitrate and nickel nitrate to prepare a combined solution. 350 cc. of the several spherical carriers prepared in accordance with the hereinbefore described procedure were then immersed respectively for 3 hours in 700 cc. of the hereinabove obtained combined solution, followed by drying for 5 hours at 110° C. and finally calcined for 3 hours at 500° C. The active metal content of the catalysts obtained in this manner were: molybdenum 9.8–10.12% by weight, cobalt 2.9–3.1% by weight and nickel 1.4–1.5% by weight.

The hydrodesulfurization of an atmospheric distillation residuum of Khurusanya crude was carried out employing a fixed bed packed with the aforesaid catalysts. The presulfiding of the catalysts was not performed in any of the cases, and the reaction conditions used were: temperature 395° C., pressure 135 kg./cm.²g., liquid hourly space velocity of the feedstock oil 1 vol./vol./hr., ratio of rate of flow of hydrogen to feedstock oil 1100 liter-NTP/liter. The desulfured oil leaving the reaction column was subjected to steam stripping to distill off hydrogen sulfide as well as other gases and cracked light oils, thus obtaining the product. The changes that occurred in the total sulfur content of the products from the start of the test to 1000 hours are shown in Table 7. Further, the properties of the products at a point 500 hours after the start of the test are shown in Table 8.

TABLE 7

| Experiment | Total sulfur content (wt. percent) | | | | |
|---|---|---|---|---|---|
| | Feedstock oil | After— | | | |
| | | 50 hours | 100 hours | 500 hours | 1,000 hours |
| Example: | | | | | |
| 9 | 4.13 | 0.59 | 0.60 | 0.65 | 0.72 |
| 10 | 4.13 | 0.61 | 0.62 | 0.68 | 0.74 |
| 11 | 4.13 | 0.65 | 0.66 | 0.72 | 0.78 |
| 12 | 4.13 | 0.58 | 0.59 | 0.64 | 0.77 |
| 13 | 4.13 | 0.70 | 0.71 | 0.76 | 0.82 |
| 14 | 4.13 | 0.61 | 0.62 | 0.67 | 0.74 |
| Control 6 | 4.13 | 0.66 | 0.68 | 0.94 | 1.22 |

TABLE 8

|  | Total sulfur content (wt. percent) | Viscosity (cst. at 50° C.) | Residual carbon (wt. percent) | Asphaltene[1] content (wt. percent) | Vanadium content (p.p.m.) | Nickel content (p.p.m.) | Total nitrogen content (wt. percent) | Amount formed of cracked light oils (wt. percent based on feedstock oil) |
|---|---|---|---|---|---|---|---|---|
| Feedstock oil | 4.13 | 354.6 | 9.91 | 5.47 | 45 | 18 | 0.27 | |
| Example: | | | | | | | | |
| 9 | 0.65 | 121.3 | 4.3 | 3.98 | 35 | 12 | 0.15 | 2.8 |
| 10 | 0.68 | 123.5 | 4.7 | 4.05 | 34 | 11 | 0.16 | 3.5 |
| 11 | 0.72 | 130.2 | 4.5 | 4.12 | 33 | 12 | 0.15 | 2.9 |
| 12 | 0.64 | 120.2 | 4.5 | 4.11 | 33 | 13 | 0.14 | 5.2 |
| 13 | 0.76 | 128.3 | 4.8 | 4.00 | 37 | 13 | 0.15 | 3.3 |
| 14 | 0.67 | 120.1 | 4.2 | 3.85 | 34 | 12 | 0.16 | 4.5 |
| Control 6 | 0.94 | 135.2 | 4.7 | 4.19 | 38 | 11 | 0.17 | 2.7 |

[1] Ether-insoluble portion.

As can be appreciated by comparison with Control 6 wherein the catalyst used does not contain a water-insoluble inorganic solid, the desulfurization activity of the catalyst prepared in accordance with the present invention possesses a rate of maintenance that is exceedingly high.

We claim:

1. A catalyst composition for use in the catalytic hydrogenation of distillation residuum-containing petroleum hydrocarbons, said catalyst composition being obtained by (a) passing a dispersion mixture through a water-immiscible inert liquid medium to form a spherical gelled product, said dispersion mixture being composed of a sol selected from the group consisting of a hydrosol of basic aluminum sulfate and a hydrosol mixture of said hydrosol and a hydrosol of silica, said dispersion mixture having dispersed therein 5-65% by weight, based on the carrier to be obtained, of particles selected from the group consisting of a water-insoluble inorganic solid selected from the group consisting of aluminum hydroxide, activated alumina, alumina oxide, alumina hydrogel, silica gel, silica hydrogel, quartz, silica-alumina gel, silica-alumina hydrogel, aluminosilicates, metal oxides, metal hydroxides, and metal sulfides wherein the metal of said oxides, hydroxides and sulfides is selected from iron, cobalt, nickel, molybdenum and copper, and active carbon; (b) water-washing the spherical gelled product of step (a); (c) subjecting the water-washed product of step (b) to a desulfating treatment; and (d) thereafter drying and calcining the desulfated product of step (c) to obtain a carrier, said carrier having deposited thereon a hydrogenatively active metal at a calcination temperature of above 350° C.

2. The catalyst composition of claim 1 wherein the drying and calcination temperature of step (d) is not higher than 750° C.

3. The catalyst composition of claim 1 wherein said water-insoluble inorganic solid is in the form of particles having a specific surface area of at least 50 square meters per gram.

4. The catalyst composition of claim 1 wherein said water-insoluble inorganic solid is in the form of particles of a particle size of not greater than 74 microns.

5. The catalyst composition of claim 1 wherein said water-immiscible inert liquid medium in a petroleum hydrocarbon heated at a temperature of 40°–100° C.

6. The catalyst composition of claim 1 wherein, prior to passing said dispersion mixture through said water-immiscible inert liquid medium, water in an amount of 10–30% by weight of said mixture is added thereto.

7. The catalyst composition of claim 1 wherein said sol is a hydrosol mixture of a hydrosol of basic aluminum sulfate and a hydrosol of silica, the weight ratio of $SiO_2/(Al_2O_3+SiO_2)$ in said carrier being 0.3 or less.

8. The catalyst composition of claim 1 wherein said active metal is deposited on the carrier by using a water-soluble compound of a metal selected from the group consisting of a metal of Groups VI and VIII of the Periodic Table.

9. The catalyst composition of claim 8 wherein said metal of Groups VI and VII is a mixture of metals selected from the group consisting of cobalt-molybdenum, nickel-molybdenum, nickel-tungsten and nickel-cobalt-molybdenum.

References Cited
UNITED STATES PATENTS

| | | | |
|---|---|---|---|
| 2,964,481 | 12/1960 | Cramer et al. | 252—455 |
| 3,442,821 | 5/1969 | Hilfman | 252—448 X |
| 2,723,243 | 11/1955 | Holden | 252—448 |
| 3,567,767 | 3/1971 | Yaswi et al. | 252—448 X |

CARL F. DEES, Primary Examiner

U.S. Cl. X.R.

252—453, 455 R, 455 Z; 208—143